United States Patent [19]
Montanari et al.

[11] 3,868,423
[45] Feb. 25, 1975

[54] PROCESS FOR PREPARING BETA,BETA'-BIS-(3,5-DIBROMO-4-HYDROXY-PHENYL)-PROPANE

[75] Inventors: Fernando Montanari; Benedetto Calcagno, both of Milan; Luciano Conti, Grizzana, all of Italy

[73] Assignee: Societa Italiana Resine S.p.A., Milan, Italy

[22] Filed: Dec. 22, 1971

[21] Appl. No.: 211,120

[30] Foreign Application Priority Data
Dec. 23, 1970  Italy.................................. 33466/70

[52] U.S. Cl........................... 260/619 A, 260/623 H
[51] Int. Cl......................... C07c 39/24, C07c 37/00

[58] Field of Search..................... 260/619 A, 623 H

[56] References Cited
FOREIGN PATENTS OR APPLICATIONS
900,136   7/1962   Great Britain.................. 260/623 H Primary Examiner—Joseph E. Evans
Attorney, Agent, or Firm—Sughrue, Rothwell, Mion, Zinn & Macpeak

[57] ABSTRACT

Beta,beta'-bis-(3,5-dibromo-4-hydroxyphenol)-propane is prepared by a bromination reaction in methanol as solvent in the presence of chlorine, the amount of chlorine being brought to excess after the addition of bromine has ceased.

6 Claims, No Drawings

PROCESS FOR PREPARING BETA,BETA'-BIS-(3,5-DIBROMO-4-HYDROXYPHENYL)-PROPANE

The present invention relates to an improved process for the production of beta,beta'-bis-(3,5-dibromo-4-hydroxyphenyl)-propane by bromination with bromine of beta,beta'-bis-(4-hydroxy-phenyl)-propane dissolved in a solvent.

Various processes for the bromination of beta,beta'-bis-(4-hydroxyphenyl)-propane are known in the art.

According to one of these processes, this compound is dissolved and suspended in aqueous acetic acid and is then reacted with bromine.

In this way, beta,beta'-bis-(3,5-dibromo-4-hydroxyphenyl)-propane is formed according to the reaction:

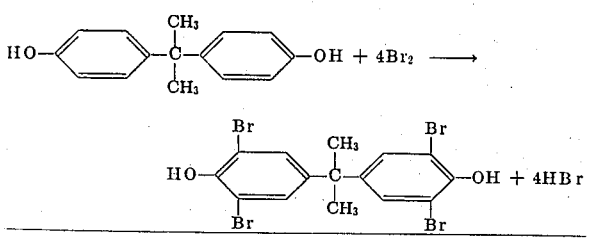

However, this transformation takes quite a long time and at the same time considerable secondary reactions take place. The product of reaction is therefore contaminated and the solvent is rich in impurities when discharged, so much so that total regeneration is necessary if the solvent is to be used again.

Furthermore, the reaction described involves a consumption of bromine in secondary reactions and this product has to be added in substantially greater than the stoichiometric quantities for the bromination reaction.

Better results have been obtained with another process, known in the art, whereby bromine and chlorine are added to a suspension or solution of beta,beta'-bis-(4-hydroxyphenyl)-propane in aqueous acetic acid.

In this case, the reaction takes place essentially according to the following:

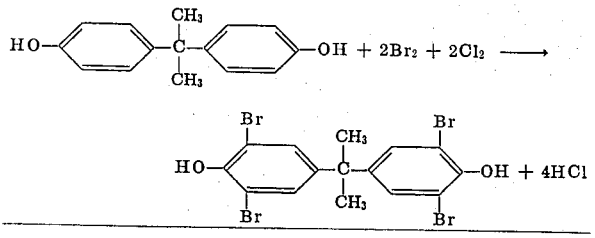

Undoubtedly, this procedure has the advantage of better utilization of the bromine in that the hydrobromic acid which develops is oxidized by the chlorine in the same reaction medium.

However, there are still various disadvantages relative above all to the low yields of reaction and the fact that the product of reaction is still rather impure.

With such a process, the yields of reaction are in fact around 70 to 80 percent and a crude beta,beta'-bis-3,5-dibromo-4-hydroxyphenyl)-propane is obtained of which the melting point does not exceed 165°C.

As a result, the brominated product has to be subjected to troublesome purification processes.

In view of the large quantity of by-products, also the acetic solvent used for bromination has to be regenerated to be further used in the reaction.

Another disadvantage connected with the process described resides in the fact that a product of reaction is obtained which contains substantial percentages of chemically bonded chlorine.

It has been found now that it is possible to eliminate or at least substantially reduce the drawbacks described in the preparation of beta,beta'-bis-(3,5-dibromo-4-hydroxyphenyl)-propane in processes in which bromine and chloride are added to beta,beta'-bis-(4-hydroxyphenyl)-propane dissolved in a solvent.

An object of the present invention is therefore a process for the production of beta,beta'-bis-(3,5-dibromo-4-hydroxyphenyl)-propane which allows a crude reaction product to be obtained which can be purified by simple and relatively inexpensive processes.

A further object of the invention is a process which allows the production of beta,beta'-bis-(3,5-dibromo-4-hydroxyphenyl)-propane with relatively high reaction yields.

A further object of the present invention is the provision of a solvent suitable for the bromination reaction of beta,beta'-bis-(4-hydroxyphenyl)-propane.

Further objects of the invention will become manifest from the following description.

The process of the present invention consists essentially in supplying liquid bromine and gaseous chlorine to beta,beta'-bis- 4-hydroxyphenyl)-propane dissolved in methanol, in carrying out the reaction at temperatures not exceeding 30°C and in recovering the beta,beta'-bis-(3,5-dibromo-4-hydroxyphenyl)-propane from the reaction mixture.

In carrying out the objects of the present invention, methanol is used as the solvent for bromination.

In this solvent, beta,beta'-bis-(4-hydroxyphenyl)-propane is dissolved and liquid bromine and gaseous chlorine are added to the agitated solution, the temperature being maintained at levels not exceeding 30°C and preferably ranging from 20° to 25°C.

It has been found that the best results are obtained with a molar ratio of bromine:beta,beta'-bis-(4-hydroxyphenyl)-propane equal to 2:1, the supply being regulated so that the bromine is in excess in the reaction medium with respect to the chlorine.

At the end of the supply of bromine, gaseous chlorine continues to be added up to a quantity in moles equal to that of the bromine and up to 10 percent in excess.

Thus, in a preferred embodiment, liquid bromine and gaseous chlorine are added to the methanol solution in such a way that when the addition of th bromine is completed, the quantity of chlorine supplied does not exceed 50 percent in moles with respect to the bromine.

The gaseous chlorine supply then continues, the temperature still being maintained within the given limits, up to a quantity in moles equal to or up to 10 percent in excess of the moles of bromine, the addition taking place in periods not less than 20 minutes.

Upon completion of the reaction, the beta,beta'-bis-(3,5-dibromo-4-hydroxyphenyl)-propane is separated by dilution of the reaction mixture with water, preferably cooled to temperatures of 15° to 16°C in order to ensure virtually complete precipitation.

The crude product thus obtained in finally recrystallized, preferably in an alcoholic solvent, for example isopropanol. By using the process of the present invention, it is possible to obtain beta,beta'-bis-(3,5-dibromo-4-hydroxyphenyl)-propane with a melting point of approximately 173° to 175°C which, after recrystallization, has a constant melting point of 177° to 179°C. The yield of recrystallized product is in any case in excess of 85 percent.

The recrystallized product also has less than 1% by weight of bonded chlorine content.

We feel that the results obtained by working according to the process of the present invention are at least partly attributable to the use of methanol as a solvent in the bromination of beta,beta'-bis-(4-hydroxyphenyl)-propane.

It should be noted that the specific effects relative to the use of such a solvent cannot be found with any other alcoholic solvent. Thus, for example, if ethanol is used, similar results are obtained to those found with aqueous acetic acid when this is used as a reaction solvent.

Finally, in view of the small quantity of by-products which are obtained when working by the process of the present invention, the solvent used in bromination can be regenerated by simple purification treatments.

EXAMPLE 1

130 ml of methanol are placed in a vessel fitted with an agitator, a dropper funnel and a system for supplying gaseous chlorine. 30 g beta,beta'-bis-(4-hydroxyphenyl)-propane are dissolved in the solvent.

While the temperature is maintained at 20° to 25°C, 42 g of liquid bromine are added through the dropper while a weak current of gaseous chlorine is passed through the flask.

In particular, the supply of the bromine takes place over approximately 60 minutes and during this time, approximately 1 N litre of chlorine is added.

When the addition of the bromine is completed, the flow of gaseous chlorine is increased and it continues to be supplied for 30 minutes up to a total of 6 N litres, the temperature still being maintained at 20° to 25°C. At the end, 30 ml of water are added to the mixture and this is cooled to 15 to 16°C.

As is apparent from above, the bromine is present in large molar excess during the time that both chlorine and bromine are being added, and when the addition of chlorine is complete, the chlorine is present in moderate molar excess.

A white crystallized precipitate is obtained which is filtered and washed with approximately 1.5 litres of water.

After being dried at 50°C for 30 hours, the product has a melting point equal to 173° to 175°C.

After recrystallization in isopropanol, 63.2 g of beta,-beta'-bis-(3,5-dibromo-4-hydroxyphenyl)-propane were obtained with a melting point constant at 177° to 179°C.

Upon elemental analysis, this exhibited a carbon content equal to 33.56 percent and a hydrogen content equal to 2.12percent. it should be noted that the theoretical levels are 33.25percent for carbon and 2.22 percent for hydrogen.

The chlorine bonded in the end product was furthermore less than 0.5percent by weight.

We claim:

1. A process for the manufacture of beta, beta'-bis-(3,5-dibromo-4-hydroxyphenyl)-propane by the bromination of beta, beta'-bis-(4-hydroxyphenyl)-propane which comprises the steps of (a) supplying liquid bromine and gaseous chlorine to a solution of beta, beta'-bis-(4-hydroxyphenyl)-propane dissolved in methanol at a rate such that the total quantity of bromine added is maintained in large excess of the total quantity of chlorine added; (b) terminating the supplying of bromine; (c) continuing the supplying of chlorine until the total molar quantity of chlorine added is in moderate excess to the total molar quantity of bromine added; and (d) recovering beta, beta'-bis-(3,5-dibromo-4-hydroxyphenyl(-propane from the products of the reaction, wherein in steps (a), (b) and (c) the temperature is maintained at levels not exceeding 30°C.

2. A process according to claim 1, wherein the temperature is maintained at between 20° and 25°C throughout steps (a), (b) and (c).

3. A process according to claim 5, wherein the beta,-beta'-bis-(3,5-dibromo-4-hydroxyphenyl)-propane is recovered from the products of reaction bh dilution with water and cooling, followed by, finally, recrystallization in isopropanol 4. A process according to claim 1 wherein the total number of moles of bromine added is twice the number of moles of beta, beta'-bis-(4-hydroxyphenyl)-propane initially present in said solution.

5. A process according to claim 1 wherein at the end of step (a) the total molar quantity of chlorine added does not exceed one-half the total quantity of bromine added.

6. A process according to claim 1 wherein said moderate excess of chlorine is up to 10percent greater than the total molar quantity of bromine.

* * * * *